Aug. 23, 1932.    C. H. WILLIS    1,873,802
ELECTRIC POWER CONVERTING APPARATUS
Filed Oct. 28, 1930
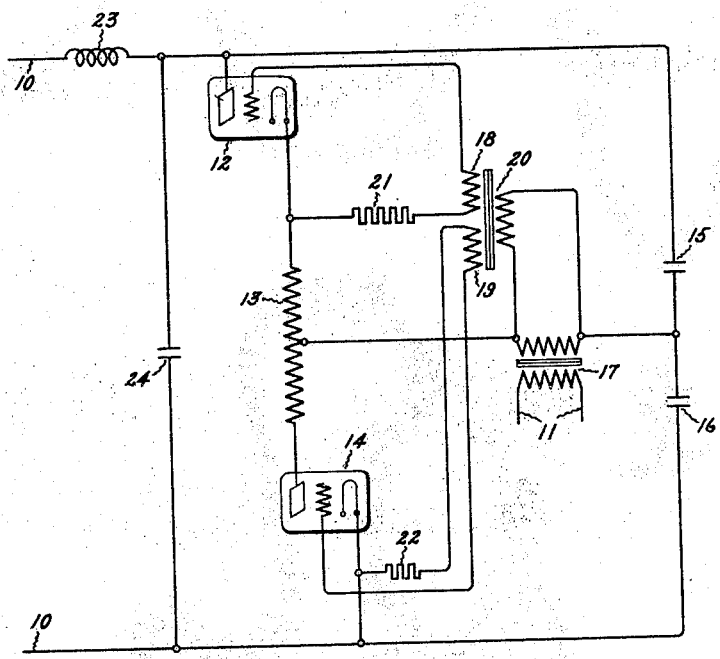
Inventor:
Clodius H. Willis,
by Charles E. Mullan
His Attorney.

Patented Aug. 23, 1932

1,873,802

UNITED STATES PATENT OFFICE

CLODIUS H. WILLIS, OF SCHENECTADY, NEW YORK, ASSIGNOR TO GENERAL ELECTRIC COMPANY, A CORPORATION OF NEW YORK

ELECTRIC POWER CONVERTING APPARATUS

Application filed October 28, 1930. Serial No. 491,807.

My invention relates to electric power converting apparatus and more particularly to such apparatus including electric valves adapted to convert direct current into alternating current.

Heretofore there have been devised numerous arrangements including electric valves for converting direct current into alternating current. When operating at very high frequencies, it has been found that certain of these arrangements utilizing electric valves of the vapor electric discharge type will occasionally short circuit the direct current circuit through the electric valves. While this short circuiting of the direct current circuit may be infrequent its consequences may be serious if allowed to persist for any considerable length of time.

It is an object of my invention to provide an improved electric power converting apparatus including electric valves in which a short circuit of the direct current circuit through the valves will be quickly cleared.

It is a further object of my invention to provide an oscillating circuit associated with an apparatus including electric valves for converting direct current into relatively high frequency alternating current by means of which any short circuit through the electric valves will be instantly cleared.

In accordance with my invention, I associate an oscillating circuit with an apparatus for converting direct current into alternating current, which may be of any of the several types well known in the art such, for example, as the so-called series inverter to which I have shown my invention applied. This oscillating circuit comprises a relatively large capacitor connected across the direct current circuit immediately adjacent the converting apparatus. A relatively large reactor is connected in series with the direct current source with the result that the oscillating circuit comprising the capacitor and the inductance of the inverter circuit will instantly interrupt a sustained short circuit through the electric valves of the inverter.

For a better understanding of my invention, together with other and further objects thereof, reference is had to the accompanying drawing and its scope will be pointed out in the appended claims. The single figure of the accompanying drawing is a diagrammatic representation of my invention as applied to a series type of inverter.

Referring to the single figure of the drawing I have shown an apparatus for receiving energy from the direct current circuit 10, converting it into alternating current and delivering it to the receiving circuit 11. This apparatus comprises a series circuit including an electric valve 12, an inductive winding 13, and an electric valve 14, respectively, connected across the direct current circuit 10 and a second series circuit comprising capacitors 15 and 16 connected in parallel to the first series circuit. Electric valves 12 and 14 are provided with an anode, a cathode, and a control grid, and may be of any of the several forms well-known in the art although I prefer to use vapor electric discharge valves in which the starting of current in the valves is determined by the potential on the control grid but in which the current through the valves may be interrupted only by reducing the anode potential below its critical value. The receiving circuit 11 is energized from the secondary winding of a transformer 17 the primary winding of which is connected between the electrical mid point of the inductive winding 13 and the junction between capacitors 15 and 16. The control grids of electric valves 12 and 14 are energized from the secondary windings 18 and 19 of a grid transformer 20 and the current limiting resistors 21 and 22, respectively. The primary winding of the grid transformer 20 is connected in parallel with the primary winding of the power transformer 17. My improved arrangement for eliminating short circuits in the electric valves 12 and 14 comprises a reactor 23 connected in series with the direct current source 10 and a capacitor 24 connected across the direct current circuit between the reactor 23 and the power converting apparatus. The reactor 23 may be the usual smoothing reactor ordinarily connected in series with power converting apparatus of this type and, together with the capacitor 24, acts as a filter circuit to suppress any alternating current component in the current drawn from the direct current circuit 10.

The operation of the power converting apparatus per se will be well understood by those skilled in the art. Assume for example that the electric valve 12 first conducts current. Current will then flow from the positive direct current line 10 through the reactor 23, electric valve 12, the upper portion of inductive winding 13, the primary winding of the transformer 17 and will charge the capacitor 16 to substantially the potential of the direct current circuit. As the current flows through the primary winding of the transformer 17, the potential across its terminals is applied to the primary winding of the grid transformer 20 and the connections of the secondary windings 18 and 19 are such that a negative potential will be impressed upon the grid of electric valve 12 and a positive potential will be impressed upon the grid of electric valve 14 at the end of the first half-cycle. By the time the capacitor 16 becomes substantially completely charged the potential of the grid of electric valve 14 will be sufficiently positive to make valve 14 conductive. The charging current for the capacitor 15 will now flow from the positive direct current line 10 through the reactor 23, the capacitor 15, the primary winding of the transformer 17, the lower half of inductive winding 13 and electric valve 14. During the same interval of time the capacitor 16 will also discharge through the primary winding of the transformer 17, the lower half of the inductive winding 13 and the electric valve 14. By the time the capacitor 15 becomes substantially charged and the capacitor 16 supstantially discharged the grid potential supplied to the secondary windings 18 and 19 of the grid transformer will have reversed polarity and have reached such a magnitude as to render the electric valve 12 conducting and the electric valve 14 non-conducting and this cycle will be repeated indefinitely, the current being transferred between electric valves 12 and 14. It will be noted that during successive half cycles the current flows in opposite directions through the primary winding of the transformer 17 with the result that an alternating current will be delivered to the receiving circuit 11.

It is well understood by those skilled in the art that the characteristics of the vapor electric discharge valves 12 and 14 are such that their control grids are effective to prevent the starting of an arc through the valves only in case the vapor contained in the valves is substantially deionized. After the valve has been carrying current, which is subsequently interrupted, a finite time is required for the gases to become deionized and, in case a positive potential is applied to the anode of a valve before it becomes completely deionized, the valve will conduct current even though its grid is excited with a negative potential. In case, for example, the electric valve 14 is rendered conductive at the same instant the current is interrupted in electric valve 12 or before the valve 12 has had time to deionize, a virtual short circuit for the direct current circuit would be completed through the valves 12 and 14 and the inductive winding 13, which has a relatively low impedance to direct current. In the operation of the type of inverter described above at very high frequencies it sometimes occurs that the natural period of oscillation of the two oscillating circuits of the inverter is of the same order of magnitude as the deionization period of the electric valves. In such a case if the operating frequencies should be slightly increased for any reason, the period of oscillation of one valve circuit may become substantially equal to or even less than the deionization period of the valves and a short circuit will occur as explained above. If such a short circuit does occur, the capacitors 15 and 16 will discharge through the inductive winding 13 and this oscillatory discharge will momentarily interrupt the current in electric valves 12 and 13. However, the natural period of this oscillatory discharge is the same as that of the individual valve circuits and will consequently be less than the deionization period of the electric valves. The capacitor 24 and the inductive winding 13, which form a second oscillatory circuit, will immediately discharge through this short circuit and, as the capacitor 24 oscillates to some negative potential, the current in electric valves 12 and 14 will be instantly interrupted due to the reversal of the anode potential. The capacitor 24 will now be recharged from the source 10 through the reactor 23. The inductance 23 is very large compared to that of the inductive winding 13 with a result that the natural period of oscillation of the reactor 23 and the capacitor 24 is much greater than that of the oscillatory circuit comprising the capacitor 24 and the inductive winding 13 and is sufficiently long that the time required to charge the capacitor 24 to a potential sufficient to send a current through the valves 12 and 14 and the inductive winding 13 is substantially greater than the deionization period of the valves 12 and 14, so that by this time their respective grids will have regained control and the apparatus will restart its normal operation as described above. In some cases it may be found desirable to duplicate the filter circuit comprising the reactor 23 and capacitor 24 to aid in filtering any alternating component of current from the direct current circuit 10 and to increase the certainty of operation of the apparatus to interrupt short circuits; that is, a second capacitor may be connected across the circuit 10 behind the reactor 23, and a second reactor connected in series therewith, as will be well understood by those skilled in the art.

While I have described what I at present consider the preferred embodiment of my invention, it will be obvious to those skilled in the art that various changes and modifications may be made without departing from my invention and, I, therefore, aim in the appended claims to cover all such changes and modifications as fall within the true spirit and scope of my invention.

What I claim as new and desire to secure by Letters Patent of the United States, is:

1. In combination with an apparatus for converting direct current into alternating current comprising an oscillating circuit including a vapor electric valve, means for clearing a short circuit through said valve comprising a second oscillating circuit also including said valve, said second circuit having a natural period of oscillation substantially greater than that of said first circuit.

2. In combination with an apparatus for converting direct current into alternating current comprising an oscillating circuit including a vapor electric valve, the natural period of oscillation being of the same order of magnitude as the deionization period of said valve, means for clearing a short circuit through said valve comprising a second oscillating circuit also including said valve having a natural period of oscillation substantially greater than the deionization period of said valve.

3. In combination with an apparatus for converting direct current into alternating current including a pair of vapor electric valves and an inductive winding serially connected across said source and a capacitor associated therewith, means for clearing a short circuit through said valves comprising a reactor having an inductance large compared to that of said inductive winding, connected in series in said direct current circuit, a second capacitor connected across said circuit between said reactor and said apparatus and having a capacitance greater than said first capacitor.

4. In combination with an apparatus for converting direct current into alternating current comprising a direct current circuit, a series circuit including a vapor electric valve, an inductive winding, and a second electric valve respectively, connected across the direct current circuit, a pair of capacitors serially connected across said circuit, and a load circuit connected between the electrical midpoint of said inductive winding and the connection between said capacitors, means for clearing a short circuit through said valves and said inductive winding comprising an inductance serially connected in said direct current circuit, and a capacitor connected across said circuit between said inductance and said apparatus.

5. Means for clearing a short circuit in a series inverter including a direct current circuit and a plurality of vapor electric valves and an inductive winding serially connected across said circuit, comprising a capacitor associated with said inverter, said capacitor and said inductive winding having a natural period of oscillation substantially greater than the deionization time of said valves, and an inductance in said direct current circuit, the natural period of oscillation of said inductance and said capacitor being substantially greater than that of said capacitor and said inductive winding.

In witness whereof, I have hereunto set my hand this 27th day of October, 1930.

CLODIUS H. WILLIS.